US007807011B2

(12) United States Patent
Dunstan et al.

(10) Patent No.: US 7,807,011 B2
(45) Date of Patent: Oct. 5, 2010

(54) MULTILAYER LAMINATE SYSTEM AND METHOD USED WITHIN BUILDING STRUCTURES

(75) Inventors: Richard C. Dunstan, Redmond, WA (US); Daniel James Johnson, Duvall, WA (US)

(73) Assignee: Stuc-O-Flex International, Inc., Redmond, WA (US)

( * ) Notice: Subject to any disclaimer, the term of this patent is extended or adjusted under 35 U.S.C. 154(b) by 0 days.

(21) Appl. No.: 11/773,915

(22) Filed: Jul. 5, 2007

(65) Prior Publication Data
US 2009/0007508 A1 Jan. 8, 2009

(51) Int. Cl.
B32B 37/00 (2006.01)
(52) U.S. Cl. .................. 156/308.2; 442/398; 428/138
(58) Field of Classification Search ............... 52/169.5, 52/309.1, 302.1, 302.3; 442/370, 372, 398; 428/137, 138; 156/71, 308.2, 308.4, 308.6, 156/308.8
See application file for complete search history.

(56) References Cited

U.S. PATENT DOCUMENTS

| | | | | |
|---|---|---|---|---|
| 3,654,765 A | * | 4/1972 | Healy et al. | 405/45 |
| 4,425,396 A | * | 1/1984 | Hartman | 428/220 |
| 4,593,511 A | * | 6/1986 | Hakasaari | 52/404.4 |
| 4,733,989 A | * | 3/1988 | Harriett | 405/43 |
| 4,923,331 A | * | 5/1990 | Kreikemeier | 405/45 |
| 5,102,260 A | * | 4/1992 | Horvath et al. | 405/50 |
| 5,560,974 A | * | 10/1996 | Langley | 428/198 |
| 5,598,673 A | * | 2/1997 | Atkins | 52/302.1 |
| 5,860,259 A | * | 1/1999 | Laska | 52/302.3 |
| 6,401,401 B1 | | 6/2002 | Williams | 52/58 |
| 6,594,965 B2 | | 7/2003 | Coulton | 52/302.1 |
| 6,804,922 B1 | * | 10/2004 | Egan | 52/408 |
| 6,807,778 B2 | | 10/2004 | Engebretson | 52/204.59 |
| 2003/0126810 A1 | * | 7/2003 | Brunson et al. | 52/169.5 |
| 2006/0211321 A1 | * | 9/2006 | Lubker | 442/208 |

OTHER PUBLICATIONS

"Rainscreens control moisture: Rain Drain," BUILDERnews Magazine, Dec. 2004, pp. 42-43, available from http://www.buildernewsmag.com.
"STYROFOAM™ WEATHERMATE™ Plus Housewrap," The Dow Chemical Company, Product Information, Form No. 179-07168-0206P&M, McKay 190833-0407, available from http://www.dow.com/PublishedLiterature/dh_006a/0901b8038006a1b3.pdf?filepath=styrofoam/ pdfs/noreg/179-07173.pdf &fromPage=GetDoc.
"Weather-Resistive Barriers: How to select and install housewrap and other types of weather-resistive barriers," U.S. Department of Energy, Technology Fact Sheet, Oct. 2000, DOE/GO-102000-0769, available from http://www.eere.energy.gov/buildings/info/documents/pdfs/28600.pdf.

* cited by examiner

Primary Examiner—Brian E Glessner
Assistant Examiner—Adriana Figueroa
(74) Attorney, Agent, or Firm—Dorsey & Whitney LLP

(57) ABSTRACT

Trapped moisture in the walls of a building structure may result in the building materials prematurely deteriorating unless there is a way for the moisture to escape. A rainscreen drainage mat provides an open cavity for the trapped moisture to escape by evaporation or gravity by draining the moisture out of the wall cavity. The multilayer laminate system includes a weather resistive barrier, drainage mat, and facer material as one application to be used within building structures to prevent moisture damage. In addition, the multilayer laminate system and method is configured to create a water resistive envelope at building material interfaces.

6 Claims, 4 Drawing Sheets

MULTILAYER LAMINATE SYSTEM AND METHOD USED WITHIN BUILDING STRUCTURES

TECHNICAL FIELD

This invention is directed toward preventing water or moisture damage within the walls of building structures, and more particularly this invention relates to a multilayer laminate system used in the walls of building structures to provide a breathable water proofing surface and drainage passage for moisture.

BACKGROUND OF THE INVENTION

The accumulation of water within the walls of building structures may cause the building structure to prematurely deteriorate. Water may penetrate through the exterior building material causing the building materials to, for example, mold, mildew or rot. In addition, the walls of a building structure are particularly susceptible to water invasion where they interface with, for example, windows, doors, cracks, adjacent roofs or electrical boxes. Therefore, the moisture needs a way to escape or evaporate before penetrating the material of the inner wall of a building structure.

In order to prevent the accumulation of water or moisture, many materials have been used to separate an inner sheathing material from an outer building cladding of a building structure. For example, corrugated foam has been used as a separator by attaching it to the inner sheathing material with an adhesive. However, this process does not provide a path for the moisture to escape. For example, the adhesive or glue during installation causes the grooves to become clogged, thus, blocking the water's path to escape through the grooves. In addition, because the foam is installed in vertical tiers on the inner sheathing material, the grooves from an upper tier may not be aligned with the grooves of a lower tier. When the grooves from separate tiers are not aligned, the water may not be able to drain properly. Furthermore, grooved foam presents a potential for residual moisture entrapment where the foam surface touches the wall due to surface tension of the water resting on the surface of the foam causing absorption of water into the foam resulting in elevated moisture levels on the surface of the substrate.

As a result of the issues associated with using foam, weather resistive barriers, also known as house wraps, are currently being used. In fact, recent code changes now require a weather resistant barrier to separate the outer building cladding from the inner sheathing material. Such a weather resistant barrier should be waterproof, but still breathable. One weather resistant material commonly used today is Tyvek®, a registered trademark of the DuPont Company. Tyvek is a synthetic material that lets water vapor escape without allowing liquid water to enter. Although Tyvek is a weather resistant material, it fails to provide separation from the outer building cladding. Corrugated Tyvek has been used to create some separation, however, it fails to provide an adequate drainage mechanism for the trapped moisture to escape because as gravity pulls water down through the Tyvek, capillary action causes the water to get "caught" in locations where the corrugated Tyvek is touching the sheathing material. This prevents much of the water from escaping the inner walls of the building structure.

To provide drainage for the trapped moisture, rainscreen drainage mats have been installed between a weather resistive barrier and the outer building cladding. An example of a rainscreen drainage mat is Enkamat® sold by Colbond Inc.

To improve installation time, rainscreen drainage mats have been bonded to an all weather resistive barrier, such as tar paper or Tyvek. Therefore, a single application can be installed on the sheathing material of the building. A facer material, such as a filter fabric, is typically installed on top of the drainage mat before the outer building cladding is installed. However, the installation of the facer material on top of the drainage mat results in a two step process. Not only does the two step process increase installation time, but it also results in the use of more fasteners that may allow water penetration into the wall.

Another concern associated with the current weather resistive barriers and drainage mat combinations is that they do not adequately prevent water from entering interfaces between dissimilar building materials, such as the interface where the window or door meets the outer building cladding. Although flashing is used to resolve this issue, it is often improperly installed resulting in water entering at the interface. In addition, flashing does not provide a seal at the interface that is capable of keeping the water out.

Therefore, there is a need for a drainage system that includes all three layers, a weather resistive barrier, a drainage mat, and a facer material, for a faster and easier single unit installation process. Likewise, there is a need for a breathable water resistant sheathing material and drainage system that can prevent water damage by creating a seal around the interface.

SUMMARY OF THE INVENTION

The present invention is directed toward a multi layer laminate drainage system, and a method for making same, for preventing moisture damage within the walls of building structures. In one aspect of the invention, the multilayer laminate drainage system includes a facer material, a drainage mat, and a weather resistive barrier (WRB).

In another aspect of the invention, the method for making the multilayer laminate drainage system includes laminating a weather resistive barrier to a drainage mat at approximately the same time as laminating the drainage mat to a filter fabric. Alternatively, the method for making the multilayer laminate drainage system includes bonding an all weather resistive barrier to a first drainage mat, bonding a facer material to a second drainage mat and bonding the first drainage mat to the second drainage mat.

Another aspect of the invention includes a method for installing a laminate drainage assembly at an interface of a building structure. The method includes separating a portion of a weather resistive barrier from a porous material and installing a building material between the separated weather resistive barrier and the porous material.

DETAILED DESCRIPTION

Embodiments of the present invention are directed toward providing a multilayer laminate drainage system and method of making and installing for use in building structures. Certain details are set forth below to provide a sufficient understanding of the invention. However, it will be clear to one skilled in the art that the invention may be practiced without these particular details.

Figure 1:
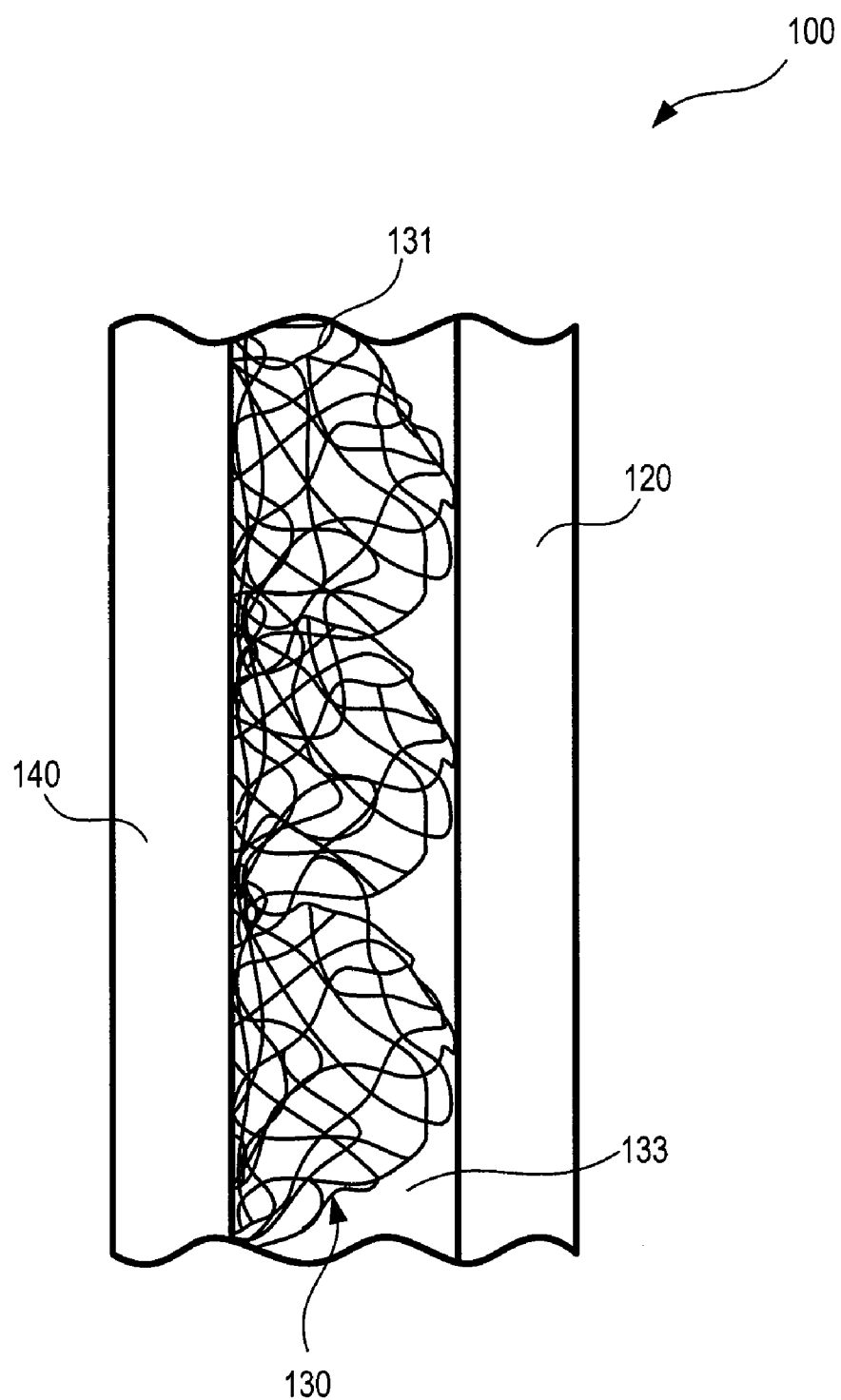
FIG. 1 is a cross sectional view of one embodiment of a multilayer laminate drainage system according to the present invention.

A multilayer laminate drainage system 100 according to one embodiment of the invention is shown in FIG. 1. The system 100 includes a facer material 140, a rainscreen drainage mat 130, and an all weather resistive barrier 120, where the facer material 140 is laminated to the drainage mat 130, and the drainage mat 130 is laminated to the all weather resistive barrier 120. The facer material 140 provides a surface for applying the outer building cladding, such as stucco, stone, wood siding, masonry, etc. The lamination process typically involves heat and/or pressure and may include an adhesive. However, other laminating processes may be used. The multilayer laminate drainage system 100 provides a single assembly to be installed on building structures to provide a drainage for water or moisture as well as a weather resistant barrier to protect sheathing materials.

The facer material 140 is typically comprised of a breathable filter fabric capable of protecting the drainage cavity, such as polypropylene, polyolefin, polyethylene or other materials. The facer material 140 is typically attached to the drainage mat 130 by heat lamination. However, other types of attachment may be used. The facer material 140 is configured to protect the cavity of the rainscreen drainage mat 130 by separating the cavity from the outer building materials such as, for example, building panels, aluminum or vinyl siding or stucco. This separation allows the cavity to remain open for water and moisture to evaporate or descend under the force of gravity through the walls to a suitable drain. The facer material 140 is particularly useful for supporting an outer building material, such as stucco, manufactured stone, fiber-cement sidings, cedar shakes or siding, "EIFS" exterior insulation & finish systems, wood based siding materials, metal panels, brick, natural stone, and ensures that the drainage mat remains open and clear of the outer building panel.

The drainage mat 130 typically consists of an extruded polymer or nylon matrix of tangled monofilaments 131. The overall shape of the drainage mat 130 may be corrugated with alternating ridges and grooves or randomized. The tangled monofilaments 131 create a mat that has a relatively large thickness compared to that of the facer material 140. This thickness is primarily comprised of open space 133 within the drainage mat 130. The open space 133 creates a cavity for drainage and ventilation so that moisture is able to escape by descending to an exit or by evaporating.

Just as one side of the drainage mat 130 is attached to the facer material 140, the other side of the mat 130 is attached to the all weather resistive barrier 120. This attachment may be made by heat lamination. Other attachment methods, however, may be used for attaching the mat 130 to the all weather resistive barrier 120. In one embodiment, the all weather resistive barrier 120 is a code compliant weather resistive barrier. A code compliant weather resistive barrier is a barrier having a minimum average water resistance of 16 hours and a maximum average water vapor transmission of 6 grams per square meters per 24 hours. In another embodiment the all weather resistive barrier 120 qualifies as a code compliant air infiltration barrier. The all weather resistive barrier 120 may be polyolefin, polypropylene, polyethylene or the like; however, other materials may be used. For example, the weather resistive barrier 120 may be made from STYROFOAM™ WEATHERMATE™ Plus housewrap sold by The Dow Chemical Company. The all weather resistive barrier 120 may be either woven or non-woven. Similarly, the all weather resistive barrier 120 may be perforated or non-perforated. In one embodiment, the all weather resistive barrier 120 is non-woven and non-perforated, thus allowing water vapor to escape while helping to prevent liquid from entering. In another embodiment, the all weather resistive based barrier 120 may be translucent, which assists builders in being able to identify studs and sheathing material.

One method of making the multilayer laminate drainage system 100 shown in FIG. 1 comprises laminating three layers in one step, where the three layers consist of a weather resistive barrier 120, a drainage mat 130, and a facer material 140. Laminating in one step is accomplished by bonding the second side of the weather resistive barrier 120 with the first side of a drainage mat 130, and at approximately the same time bonding the second side of the drainage mat 130 with a first side of a facer material 140.

Figure 2A:
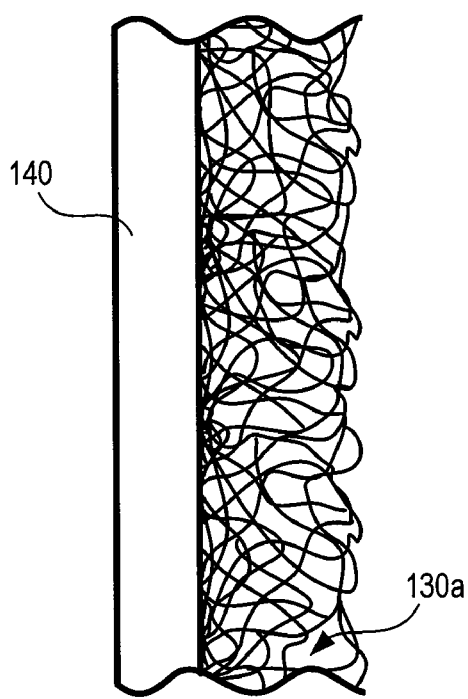
FIG. 2A is a cross sectional view of one embodiment of a facing surface laminated to a drainage mat according to the present invention.
Figure 2B:
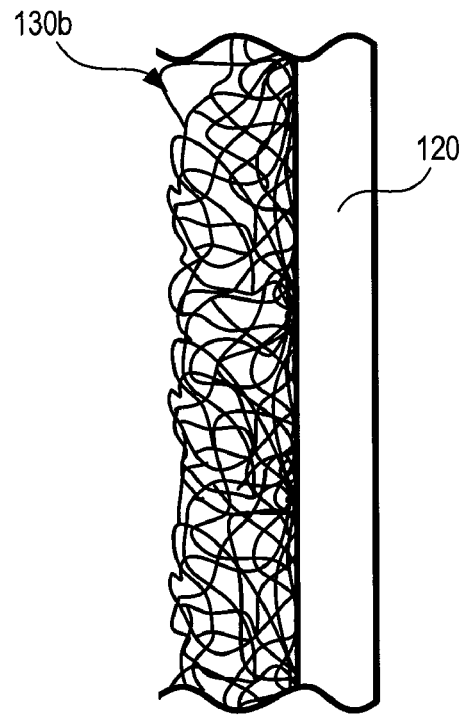
FIG. 2B is a cross sectional view of one embodiment of an all weather resistive barrier laminated to a drainage mat according to the present invention.
Figure 2C:
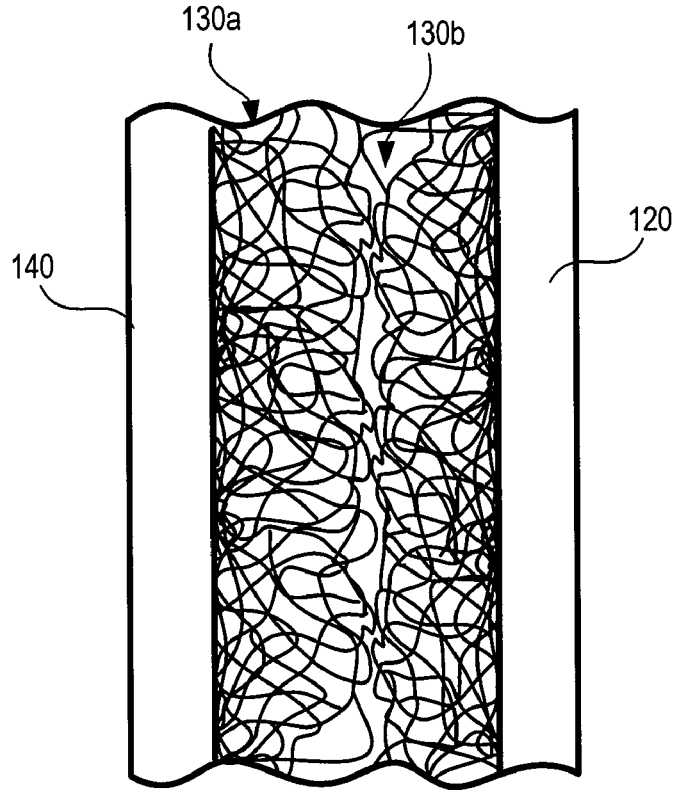
FIG. 2C is a cross sectional view of one embodiment of the multilayer laminate drainage system formed from combining the structure of FIG. 2A with the structure of FIG. 2B according to the present invention.

Another method of making a multilayer laminate drainage system 101 is shown in FIGS. 2A, 2B, and 2C. FIG. 2A shows a first drainage mat 130a laminated to a facer material 140. FIG. 2B shows a second drainage mat 130b laminated to a weather resistive barrier 120. FIG. 2C shows the structures of FIG. 2A and FIG. 2B laminated together resulting in a laminate of a facer material 140, a first drainage mat 130a, a second drainage mat 130b, and a weather resistive barrier 120.

The multilayer laminate drainage systems 100 and 101 created from either of the processes described above result in a product that allows an installer or construction worker to apply a weather resistive barrier, rainscreen drainage mat, and facer material assembly in a single application. Because it can be installed in a single application, using the multilayer laminate results in a shorter installation time. Installation may include attaching the multilayer laminate system to a sheathing material of a building structure and then attaching the outer building cladding to the facer material of the multilayer laminate system.

Figure 3:
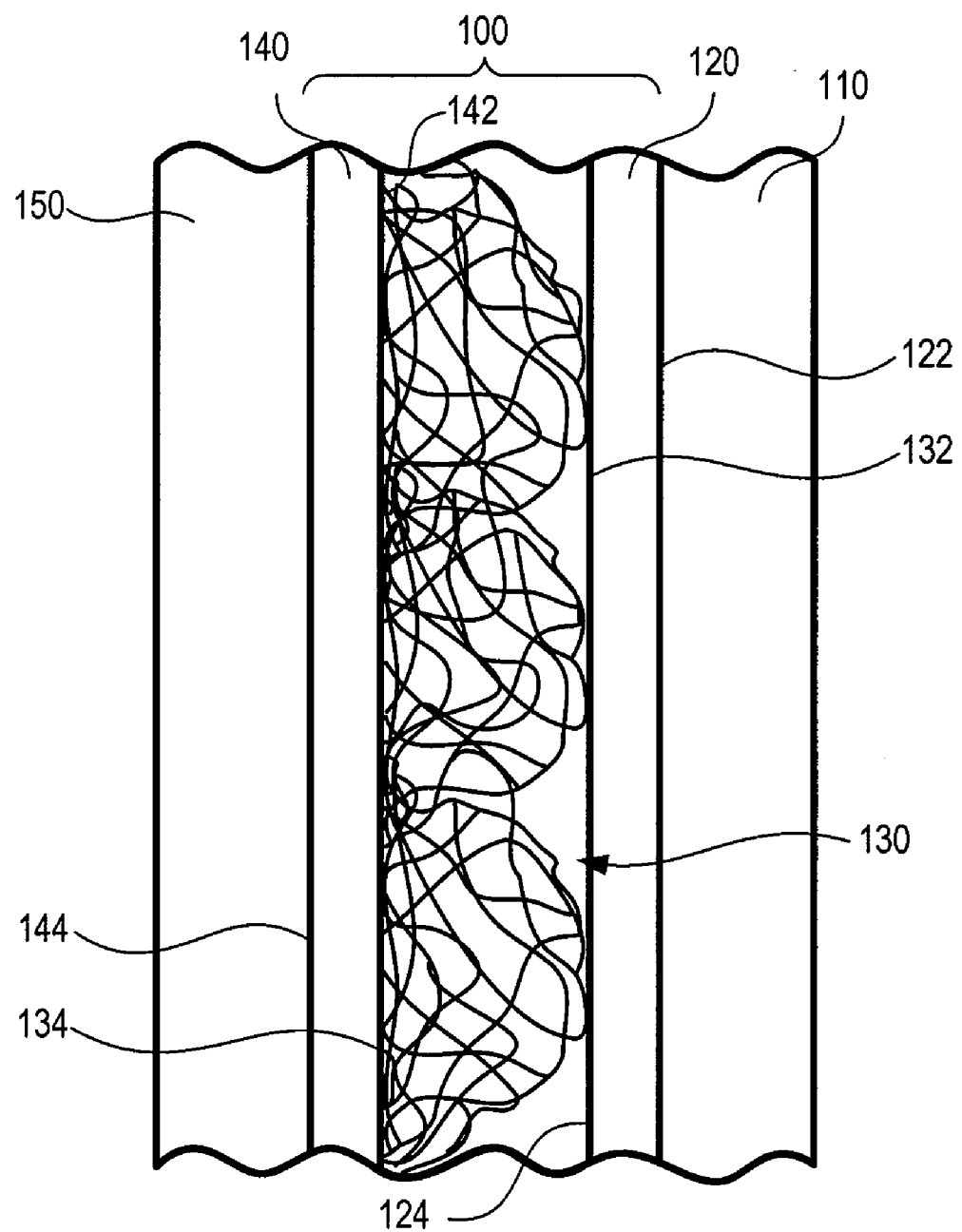
FIG. 3 is a cross sectional view of one embodiment of the multilayer laminate drainage system installed in a building structure according to the present invention.

FIG. 3 is a cross sectional view of a multilayer laminate drainage system 100 installed in a building structure according to one embodiment of the invention. The weather resistive barrier 120 has a first side 122 and a second side 124. Similarly, the drainage mat 130 and the facer material 140 have a first side 132, 142 and a second side 134, 144, respectively. The second side 124 of the resistive barrier 120 is laminated to the first side 132 of the drainage mat 130. The second side 134 of the drainage mat 130 is laminated to the first side 142 of the facer material 140.

In one embodiment, the multilayer laminate drainage system 100 is attached to the wall sheathing material 110 by fasteners. The fasteners go through the facing material 140, the drainage mat 130, and the weather resistive barrier 120 and attach to the sheathing material 110. The lowest layer of the drainage system 100 is attached to the sheathing material 110 first and then a second layer overlaps the top of the first layer so that descending water does not run between the walls. The second side 144 of the facing material 140 is exposed and configured to receive the outer building cladding 150. The facing material 140 protects the cavity of the drainage mat 132 by preventing the outer building cladding 150 from intruding into the cavity. In addition, the facing material 140 provides the function of mechanical reinforcement of the siding materials, resulting in a stronger wall. Because the facing material 140 is a relatively solid surface as compared to the drainage mat 130, the facing surface 140 distributes point loading, which results in a flatter exterior building wall 150.

Figure 4:
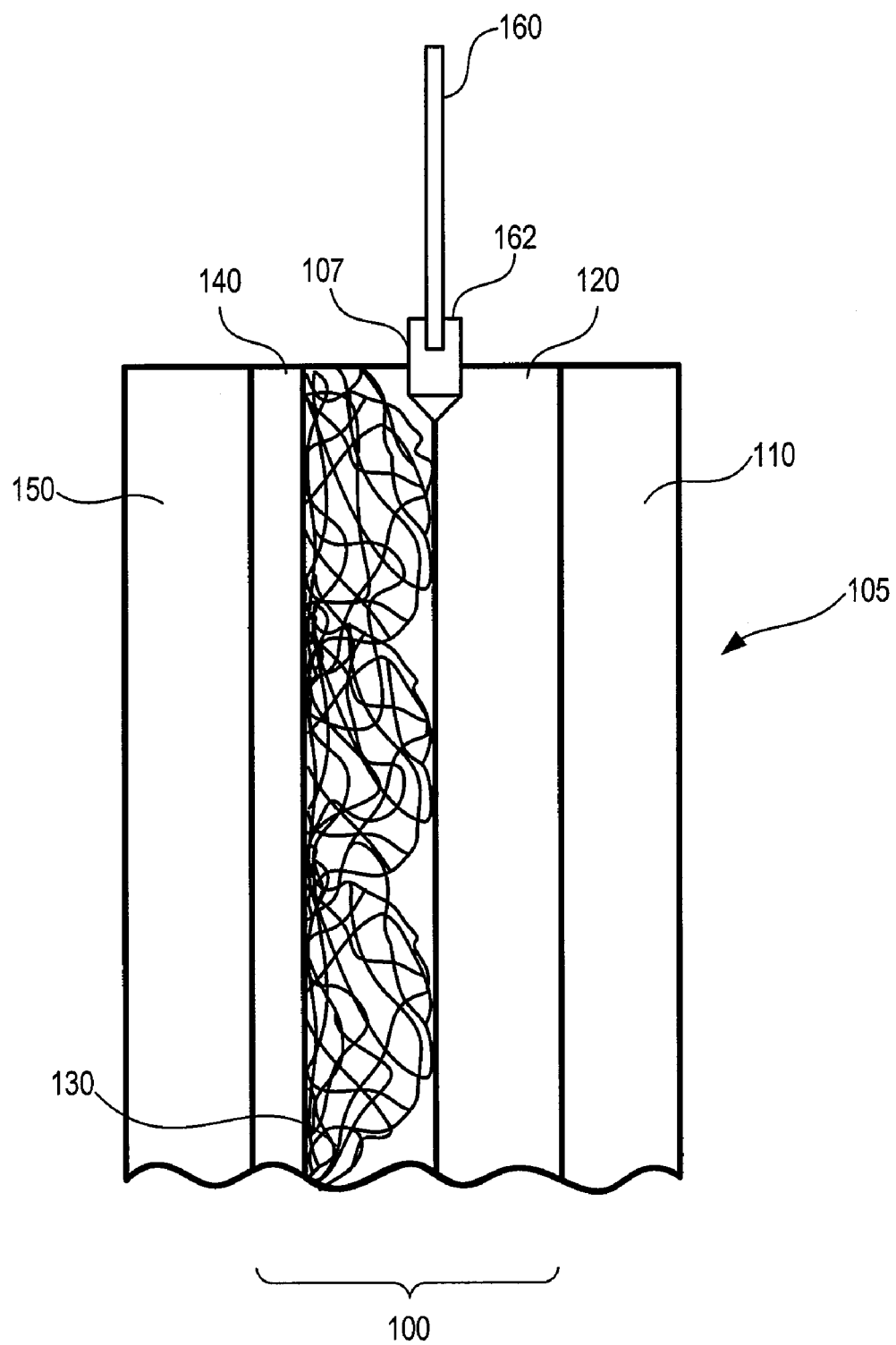
FIG. 4 is a cross sectional view of one embodiment of the multilayer laminate drainage system installed in a building structure around a window frame according to the present invention.

FIG. 4 is a cross section view of a building structure 105 with a through wall penetration where a window 160 including a window frame 162 is installed. The point at which the window 160 and window frame 162 meet the outer building cladding 150 creates an interface 107. Any object or building material dissimilar from the outer building cladding 150 creates an interface. An interface 107 created by dissimilar materials often results in voids that allow water or moisture to enter within the building structure walls causing damage. Typically, flashing techniques have been used to prevent water from entering at interfaces 107. However, even when flashing is used, there is still a significant risk of water entering the building structure.

In one embodiment, a drainage system 100 is attached to the entire building structure, including the wall sheathing material 110 and all through wall penetrations. The facer material 140 and the drainage mat 130 are removed from the weather resistive barrier 120 at the through wall penetrations without compromising the integrity of the barrier 120. The facer material 140 and the drainage mat 130, however, provide some overhang around the perimeter of the through wall penetration. The barrier 120 is then cut within the through wall penetration in a manner so that the barrier 120 may be folded in to the opening. A person having ordinary skill in the art would be familiar with the type of cut used so in the interest of brevity, a further explanation of the cut will be omitted. The overhang of the facer material 140 and drainage mat 130 around the perimeter of the through wall penetration is pulled back from the barrier 120, again, without compromising the integrity of the barrier 120. A window frame, or any other object to be installed in the through wall penetration, is placed between the folded in barrier 120 and the drainage mat 130, so that the barrier 120 and the drainage mat 130 are sandwiching the window frame 162. The barrier 120 is sealed around the inside perimeter of the window frame 162, and the drainage mat 130 is sealed around the outside perimeter of the window frame 162. This seal prevents water from leaking into the interior walls of the building structure at the interface 107 where the window 160 and building material meet.

In another embodiment, the drainage system 100 works in conjunction with traditional flashing material to create a weather resistive seal around a through wall penetration. In this embodiment, flashing material is installed around the perimeter of the through wall penetration so that the flashing material extends past the perimeter of the through wall. Typically, the flashing material extends about 9 inches beyond the perimeter of the through wall penetration, however, other lengths may be used. In one embodiment, the drainage system 100 covers the entire through wall penetration and then is cut out with an overhang around the perimeter of the through wall penetration. In another embodiment, the drainage system 100 is installed to overhang the perimeter of the through wall penetration. The weather resistive barrier 120 is then separated from the drainage mat 130 while maintaining the structural integrity of each component of the drainage system 100. The window frame is placed within the through wall penetration so that the flashing material is surrounding the perimeter of the outside surface of the window frame, and the drainage mat 130 is against the flashing material. In addition, the barrier 120 is surrounding the perimeter of the inside surface of the window frame. A seal is created around the inside and outside surfaces. The seal, in conjunction with flashing, results in a water resistive envelope that can more adequately prevent water from entering between the walls of a building structure. This configuration is applied to the entire perimeter of the window 160 creating a water resistive envelope around the entire window. Thus, the weather resistive barrier 120 is sealed around the entire window protecting the inner sheathing material 110 from moisture or water.

Not only does the drainage system create a better seal around through wall penetrations, but it improves the installation process. Because the three layers are installed at one time, the time for installation is decreased. In addition, because it does not require the overlapping layers to be aligned, it is easy to install.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

We claim:

1. A method of making a multilayer drainage assembly, comprising:
   heat bonding a first matrix of tangled monofilaments comprising substantial void space and permitting liquid drainage to a first surface of a moisture resistive barrier; and
   heat bonding a second matrix of tangled monofilaments comprising substantial void space and permitting liquid drainage to a first surface of a filter fabric;
   adhering a first surface of the first matrix of tangled monofilaments to a first surface of the second matrix of tangled monofilaments, the first matrix of tangled monofilaments, the second matrix of tangled monofilaments, the moisture resistive barrier, and the filter fabric forming an assembly configured to be applied to an outer surface of a building structure as a single assembly.

2. The method of claim 1 wherein the moisture resistive barrier comprises at least one of polyolefin, polypropylene, and polyethylene.

3. The method of claim 1 wherein the filter fabric comprises at least one of polyolefin, polypropylene, and polyethylene.

4. The method of claim 1 wherein the first and second matrix of tangled monofilaments comprises at least one of a polymer or nylon matrix.

5. The method of claim 1 wherein the moisture resistive barrier comprises at least one of a translucent moisture resistive barrier, a non-perforated moisture resistive barrier, a perforated moisture resistive barrier, a non-woven moisture resistive barrier, or a woven weather resistive barrier.

6. The method of claim 1 wherein the first and second matrix of tangled monofilaments comprises at least one of extruded polymer or extruded nylon.

* * * * *